(12) United States Patent
Muramatsu

(10) Patent No.: US 7,426,741 B2
(45) Date of Patent: Sep. 16, 2008

(54) DISK DEVICE WITH IMPROVED PC BOARD MOUNTING

(75) Inventor: Akira Muramatsu, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 369 days.

(21) Appl. No.: 11/348,550

(22) Filed: Feb. 7, 2006

(65) Prior Publication Data

US 2006/0176662 A1    Aug. 10, 2006

(30) Foreign Application Priority Data

Feb. 8, 2005    (JP) .......................... P2005-031604

(51) Int. Cl.
G11B 17/04    (2006.01)
G11B 33/14    (2006.01)

(52) U.S. Cl. ...................... 720/652; 720/605

(58) Field of Classification Search ................ 720/601, 720/650, 652, 657, 653
See application file for complete search history.

(56) References Cited

U.S. PATENT DOCUMENTS 6,587,419 B1 *    7/2003    Aizawa et al. .............. 720/650
2004/0163094 A1 *    8/2004    Matsui et al. ................ 720/650
2006/0179446 A1 *    8/2006    Bickford et al. ............. 720/650
2006/0184956 A1 *    8/2006    Muramatsu .................. 720/650
2007/0074234 A1 *    3/2007    Peng ........................... 720/650
2007/0136734 A1 *    6/2007    Sasaki et al. ................ 720/646

FOREIGN PATENT DOCUMENTS

JP    A-6-251479    9/1994

* cited by examiner

*Primary Examiner*—Brian E Miller
(74) *Attorney, Agent, or Firm*—Morgan, Lewis & Bockius LLP

(57) ABSTRACT

A primary printed circuit board (PPCB) is put on a plurality of leg rods integrally protruding from a bottom plate portion, a central insertion hole, which is one of the three insertion holes formed in the three corners of the PPCB, is engaged with an engaging pin integrally protruding from an upper surface of one of the leg rods, a screw is screwed into a screw hole of one of the leg rods through one of the insertion holes opposed to each other along a diagonal line, a holding rod is integrally protruded from a roof plate portion being opposed to one of the insertion holes opposed to each other along the diagonal line, a holding pin protruded from a lower surface of the holding rod is engaged with an engaging hole of one of the leg rods through one of the insertion holes, and a small gap is formed between a lower surface of the holding rod and the PPCB.

7 Claims, 11 Drawing Sheets

DISK DEVICE WITH IMPROVED PC BOARD MOUNTING

BACKGROUND OF THE INVENTION

1. Field of the Invention

The present invention relates to a disk device such as DVD player in which information of the disk is regenerated, recorded or deleted. More particularly, the present invention relates to a disk device in which the number of parts is reduced, the malfunction caused by static electricity is prevented and the problem caused by a so-called avalanche phenomenon of the disk is solved.

2. Description of the Related Art

The technique of a conventional DVD player is described in JP-A-6-251479. Referring to FIGS. 9 to 10B, an example of the technique of the conventional DVD player is explained below. The box-shaped housing 1 made of synthetic resin is composed of a roof plate portion 1a, a bottom plate portion 1b and a front plate portion 1c. In this housing 1, the unit body 2 is arranged close to one side wall 26, 27 (shown in FIG. 13) of the roof plate portion 1a and the bottom plate portion 1b. In the periphery of the unit body 2 arranged in the housing 1, audio/video printed circuit board 3, which is formed into a substantial L-shape when it is seen in a plan view, and the primary printed circuit board 4 having an electronic part A, which is formed into a rectangular plate, are respectively arranged in the vertical direction, leaving a predetermined interval between them.

The unit body 2 includes: a main chassis for supporting the tray 7, on which the disk D is put, so that the tray 7 can be moved forward and backward "a and b"; and a drive chassis 13, which is supported by the main chassis 8 so that the drive chassis can be pivotally moved upward and downward "c and d" round the support shaft 9, wherein the optical pickup 10 and the spindle motor 12 having a turntable 11 are mounted on the drive chassis 13. The cam shaft 14 protruding from the front face of the drive shaft 13 is inserted into the cam groove 15a of the cam slider 15. The cam slider 15 is arranged in the main chassis 8 so that it can be slid in the lateral direction "e and f" which is perpendicular to the longitudinal direction "a and b". When the cam slider 15 is slid to the left "e" or (to the right "f"), the drive chassis 13 can be moved upward and downward "c and d". The disk holder 17 having a magnet, which is opposed to the turntable 11, is arranged in the cross beam 18, which is provided between both side walls 8a of the main chassis 8, so that the disk holder 17 can be elevated in a predetermined range. In this connection, reference numeral 19 is a disk accommodating recess portion formed in the central portion of the tray 7, and reference numeral 20 is a floating prevention piece extending from both side wall portions 8a of the main chassis 8 to both side edge recess step portions 7a of the tray 7.

The principle of movements will be explained below. FIG. 9 drawn by solid lines and FIG. 10A show a play mode. In this play mode, the disk D is rotated at high speed by the spindle motor 12 through the turntable 11, and information recorded on the disk D is read out by the optical pickup 10 and an image is regenerated on a monitor.

When an unloading signal is inputted in the play mode, as shown in FIG. 10B, the cam slider 15 is slid to the left "e" (or to the right "f") so as to move the drive chassis 13 downward "d". Due to the foregoing, the disk D is delivered from the turntable 11 to the tray 7, and then the tray 7 is moved forward "a" passing through the disk output port 21 provided in the front plate portion 1c. The disk D is picked up from the tray 7 and a new disk D is put on the tray 7.

Successively, when a loading signal is inputted, as shown in FIG. 10A, the tray 7 is moved backward "b" and accommodated in the housing 1. After that, the cam slider 15 is slid to the right "f" (or to the left "e") so as to move the drive chassis upward "c". Due to the foregoing, the disk D on the tray 7 is held by the turntable 11 and the disk holder 17.

As shown in FIG. 11, the other end portions of the flexible flat cables 5a, 5b, one end portions of which are connected to the primary printed circuit board 4 arranged on the upper side, are connected to the audio/video printed circuit board 3 arranged on the lower side. As shown in FIG. 12A, the primary printed circuit board 4 is put on a plurality of leg rods 28a to 28c protruding from the bottom plate portion 1b. The central insertion hole 4b, which is one of the three insertion holes 4a to 4c formed in the three corners of the primary printed circuit board 4, is engaged with the engaging pin 29 integrally protruding from an upper surface of the central leg rod 28b. Through the remaining two insertion holes 4a, 4c, which are opposed to each other along the diagonal line P (shown in FIG. 9), the screws 30a, 30b are screwed into the screw holes 39a, 39b formed in the leg rods 28a, 28c. Due to the foregoing, the primary printed circuit board is fixed close to the other side wall 31, 32 of the roof plate portion 1a and the bottom plate portion 1b as shown in FIG. 9. Therefore, the primary printed circuit board is grounded through the screws 30a, 30b.

SUMMARY OF THE INVENTION

In the above constitution, two screws 30a, 30b are used for fixing the primary printed circuit board 4. Therefore, the number of parts is large and the manufacturing cost is expensive. Further, it takes time and labor to screw the screws 30a, 30b.

Therefore, it can be considered to take the following countermeasures. As shown in FIG. 12B, the screw 30b, which is one of the two screws 30a, 30b, is omitted and the remaining screw 30a is screwed into the screw hole 39a of the leg rod 28a through one insertion hole 4a which is opposed along the diagonal line P. Further, the engaging pin 29 is integrally protruded from an upper surface of the leg rod 28c opposed to the other insertion hole 4c, and the engaging pin 29 is inserted into the other insertion hole 4c. Due to the above constitution, the primary printed circuit board 4 is engaged only by one screw 30a. Therefore, by the upward pushing force F (shown in FIG. 11) generated when the flexible flat cables 5a, 5b are bent, the primary printed circuit board 4 is floated by a predetermined distance k (for example, 2 to 3 mm). Concerning this matter, refer to the virtual lines in FIG. 12B. Accordingly, there is a possibility that the primary printed circuit board 4 is vibrated and uncomfortable noise is generated by the reciprocating motion of the optical pickup and the high speed rotation of the turntable 11 in the play mode.

The procedure of the electrostatic test will be explained as follows. As shown in FIGS. 9 and 13, while the electrostatic tester 33 is being moved along the outer circumference of the housing 1 so as to generate static electricity, it is checked by thus generated static electricity whether or not malfunction is caused in the unit body 2 and the electronic parts A which are mounted on the audio/video printed circuit board 3 and the primary printed circuit board 4. However, the following problems may be caused in this constitution. According to the request of downsizing the disk device, the primary printed circuit board 4 is arranged coming close to the other side wall 31, 32 while leaving a small gap (for example a gap of 2 to 3 mm). Therefore, when the electrostatic test is made by the electrostatic tester 33, static electricity flows through the gap 34 between the other side wall 31, 32 and short-circuits to the screw 30a and the electronic parts A. As a result, malfunction is caused in the electronic parts A. Further, there is a possibility that the electronic parts A are damaged.

As shown by the solid line in FIG. 14, when the power source is turned off under the condition that the tray 7 is advanced according to an unloading signal, the drive chassis is stopped under the condition that it is moved downward "d". When the tray 7 is forcibly pushed to the rear side "b" by a finger and returned into the casing 1, the turntable 11 is kept downward. Therefore, the disk D on the tray 7 can not be held by the turntable 11 and the disk holder 17.

When the housing 1 is inclined, for example, so as to be conveyed to another place as shown by the virtual line in FIG. 14 under the condition that the disk D is not held as described above, the disk D accommodated in the disk accommodation recess portion 19 is detached to the rear side "b". Therefore, as shown by the reference mark A in FIG. 9, the rear half portion of the disk D protrudes from the tray 7 and a so-called avalanche phenomenon is caused.

When the power source is turned on in this state and the tray is advanced "a" according to an unloading signal, the disk D is left at the rear in the housing 1 and dropped into the housing 1. Further, there is a possibility that the disk D is pinched between the tray 7 and the cross beam 18 when the disk D is advanced "a".

The present invention has been accomplished to solve the above conventional problems. It is an object of the present invention to provide a disk device characterized in that: the number of parts is reduced; the malfunction caused by static electricity is prevented; and the problem of a so-called avalanche phenomenon of the disk is solved.

In order to accomplish the above object, according to a first aspect of the invention, there is provided a disk device in which a rectangular box-shaped housing made of synthetic resin is composed of a roof plate portion, a bottom plate portion and a front face plate portion, a unit body is arranged in the housing while the unit body is being made to come close to one side wall of the roof plate portion and the bottom plate portion, an audio/video printed circuit board and a rectangular-plate-shaped primary printed circuit board having electronic parts are arranged upward and downward in a periphery of the unit body in the housing while leaving a predetermined interval between the audio/video printed circuit board and the primary printed circuit board in the vertical direction, a flexible cable with first and second ends, one end of which is connected to the primary printed circuit board on the upper side, the other end is connected to the audio/video printed circuit board on the lower side, the primary printed circuit board is put on a plurality of leg rods integrally protruding from the bottom plate portion, a central insertion hole, which is one of three insertion holes formed in the three corners of the primary printed circuit board, is engaged with an engaging pin integrally protruding from an upper surface of one of the leg rods, when a screw is screwed into a screw hole of one of the leg rods through one of two insertion holes opposed to each other along a diagonal line, the primary printed circuit board is fixed coming close to the other side wall of the roof plate portion and the bottom plate portion, the unit body includes a main chassis for supporting a disk tray so that the disk tray can be moved forward and backward and also includes a drive chassis, which is pivotally supported by the main chassis so that the drive chassis can be moved upward and downward, on which an optical pickup and a turntable are mounted, when a drive chassis is moved downward according to an unloading signal in a play mode in which the disk is rotated by the turntable at high speed and information recorded on the disk is read out by the optical pickup, the disk is delivered from the turntable to the tray, after that, the tray is advanced through a disk output port in the front face plate portion, the disk is picked up from the tray and a new disk is put on the tray, when the chassis is stopped in the downward state by turning off the electric power source and the tray is forcibly pushed onto the rear side, the tray is returned into the housing, one of the two screws is omitted, the screws are screwed into screw holes of the leg rods through insertion holes opposed to each other along the diagonal line, a holding rod is integrally protruded from the roof plate portion being opposed to one of two insertion holes that are opposed to each other along the diagonal line, a holding pin protruded from a lower surface of the holding rod is engaged with an engaging hole of one of the leg rods through the other of one of two insertion holes that are opposed to each other along the diagonal line, a small gap is formed between a lower surface of the holding rod and the primary printed circuit board, an electrostatic prevention plate, the width of which is wider than that of the printed circuit board, is hung from the roof plate portion coming close to the other side wall of the roof plate portion and the bottom plate portion, a lower end of the electrostatic prevention plate is extended to a periphery of the primary printed circuit board and comes close to a rear portion of the tray accommodated in the housing, a protruding portion is integrally protruded from the roof plate portion, and a lower end of the protruding portion is positioned at a position lower than an upper surface of the tray.

According to a second aspect of the invention, there is provided a disk device in which a rectangular box-shaped housing made of synthetic resin is composed of a roof plate portion, a bottom plate portion and a front face plate portion, a unit body is arranged in the housing while the unit body is being made to come close to one side wall of the roof plate portion and the bottom plate portion, an audio/video printed circuit board and a rectangular-plate-shaped primary printed circuit board having electronic parts are arranged upward and downward in a periphery of the unit body in the housing while leaving a predetermined interval between the audio/video printed circuit board and the primary printed circuit board in the vertical direction, a flexible cable with first and second ends, one end of which is connected to the primary printed circuit board on the upper side, the other end is connected to the audio/video printed circuit board on the lower side, the unit body includes a main chassis for supporting a disk tray so that the disk tray can be moved forward and backward and also includes a drive chassis, which is pivotally supported by the main chassis so that the drive chassis can be moved upward and downward, on which an optical pickup and a turntable are mounted, when a drive chassis is moved downward according to an unloading signal in a play mode in which the disk is rotated by the turntable at high speed and information recorded on the disk is read out by the optical pickup, the disk is delivered from the turntable to the tray, after that, the tray is advanced through a disk output port in the front face plate portion, the disk is picked up from the tray and a new disk is put on the tray, when the chassis is stopped in the downward state by turning off the electric power source and the tray is forcibly pushed onto the rear side, the tray is returned into the housing, the primary printed circuit board is put on a plurality of leg rods integrally protruding from the bottom plate portion, a central insertion hole in the insertion holes formed in one of the three corners of the printed circuit board is engaged with an engaging pin integrally protruding from an upper surface of one of the leg rods, a screw is screwed into a screw hole of one of the leg rods through one of the insertion holes opposed to each other along a diagonal line, a holding rod is integrally protruded from the roof plate portion being opposed to one of the insertion holes opposed to each other along the diagonal line, and the holding rod and the leg rod, which is opposed to the holding rod, are engaged with each other through one of the insertion holes.

According to a third aspect of the invention, there is provided a disk device according to the second aspect of the invention, wherein a holding pin is integrally protruded from a lower surface of the holding rod, an engaging hole is formed in an upper surface of the leg rod opposing to the holding pin, and the holding pin is engaged in an engaging hole of the leg rod through one of the insertion holes so as to form a small gap between the lower surface of the holding rod and the primary printed circuit board.

According to a fourth aspect of the invention, there is provided a disk device according to the third aspect of the invention, wherein an outer circumferential surface of the holding pin is formed into a tapered shape being made narrower, and the tapered outer circumferential surface is made to come close to or come into contact with an inner circumferential edge of one of the insertion holes.

According to a fifth aspect of the invention, there is provided a disk device according to the second aspect of the invention, wherein an engaging hole is formed on the lower surface of the holding rod, an engaging pin is integrally protruded from the upper surface of the leg rod being opposed to the engaging hole, the engaging pin is engaged in the engaging hole of the holding rod through one of the insertion holes so as to form a small gap between the lower surface of the holding rod and the primary printed circuit board.

According to a sixth aspect of the invention, there is provided a disk device according to one of the second to fifth aspects of the invention, wherein an electrostatic prevention plate, the width of which is wider than that of the primary printed circuit board, is opposed to the primary printed circuit board and hung from the roof plate portion coming close to the other side wall of the roof plate portion and the bottom plate portion, and a lower end of the electrostatic prevention plate is extended to a portion close to the primary printed circuit board.

According to a seventh aspect of the invention, there is provided a disk device according to one of the second to sixth aspects of the invention, wherein a protruding portion is hung from the roof plate portion coming close to a rear portion of the tray accommodated in the housing, and a lower end of the protruding portion is positioned at a position lower than the upper surface of the tray.

According to the first aspect of the invention, the primary printed circuit board is fixed by one screw and the holding rod having the holding pin integrally protruded from the roof plate portion. Therefore, one screw is omitted as compared with the conventional structure. Accordingly, the number of parts can be decreased in accordance with the omission of the screw and the manufacturing cost can be reduced. Since the small gap is formed between the lower surface of the holding rod and the primary printed circuit board, even when an impact force is given to the roof plate portion in the drop test, the impact force is absorbed by the gap. Therefore, it is possible to prevent the housing from being damaged or broken by the impact force.

Further, a distance on the surface from the gap between the other side wall to the primary printed circuit board is prolonged. Therefore, even when the electrostatic test is made by an electrostatic tester, the electronic parts provided on the primary printed circuit board are not short-circuited by static electricity. There is no possibility that malfunction is caused in the electronic parts. Further, there is no possibility that the electronic parts are damaged.

Even if the disk is going to be detached from the tray to the rear side when the housing is inclined so that it can be conveyed to another place, since the protruding portion is arranged being hung from the roof plate portion coming close to the rear portion of the tray, there is no possibility that the disk gets over the protruding portion and is detached to the rear side. Since the lower end of the protruding portion is positioned at a position lower than the upper surface of the tray, there is no possibility that the disk passes through under the protruding portion and is detached to the rear side, that is, the occurrence of a so-called avalanche phenomenon can be positively prevented and the disk can be kept on the tray. Therefore, when the tray is advanced, the disk can be smoothly taken out from the housing.

According to the second aspect of the invention, since the primary printed circuit board is fixed by one screw, by the holding rod, which is integrally protruded from the roof plate portion, and by the leg rod, that is, one screw is omitted as compared with the conventional structure. Therefore, the number of parts can be decreased and the manufacturing cost can be reduced.

According to the third aspect of the invention, the holding pin integrally protruding from the lower surface of the holding rod is engaged in the engaging hole of the leg rod through one of the other insertion holes. Therefore, the primary printed circuit board can be positively fixed onto the leg rod. Further, since the small gap is formed between the lower surface of the holding rod and the primary printed circuit board, even when an impact force is given in the drop test, the impact force is absorbed by the gap. Therefore, it is possible to prevent the housing from being damaged or broken by the impact force.

According to the fourth aspect of the invention, the tapered outer circumferential surface of the holding pin is engaged into one of the insertion holes as if the holding pin fit into the insertion hole. Therefore, the primary printed circuit board can be more positively fixed.

According to the fifth aspect of the invention, the same effect as that of the third aspect of the invention can be provided.

According to the sixth aspect of the invention, a distance on the surface from the gap between the other side wall to the primary printed circuit board is prolonged. Therefore, even when the electrostatic test is made by an electrostatic tester, the electronic parts provided on the primary printed circuit board are not short-circuited by static electricity. There is no possibility that malfunction is caused in the electronic parts. Further, there is no possibility that the electronic parts are broken.

According to the seventh aspect of the invention, even if the disk is going to be detached from the tray to the rear side when the housing is inclined so that it can be conveyed to another place, since the protruding portion is arranged being hung from the roof plate portion coming close to the rear portion of the tray, there is no possibility that the disk gets over the protruding portion and is detached to the rear side. Since the lower end of the protruding portion is positioned at a position lower than the upper surface of the tray, there is no possibility that the disk passes through under the protruding portion and is detached to the rear side, that is, the occurrence of a so-called avalanche phenomenon can be positively prevented and the disk can be kept on the tray. Therefore, when the tray is advanced, the disk can be smoothly taken out from the housing.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

Figure 1:
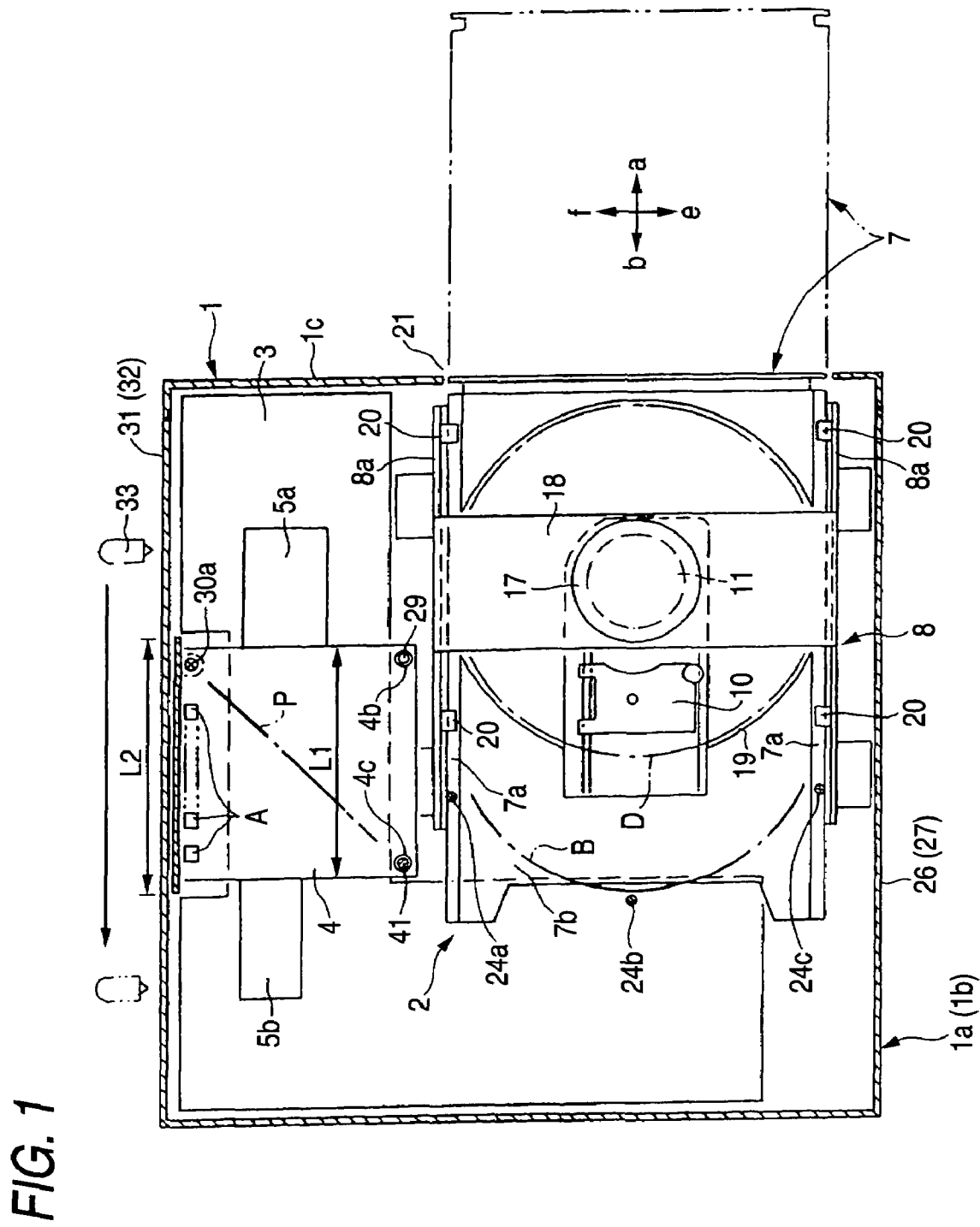
FIG. 1 is a horizontal sectional view showing a disk device of the first embodiment of the present invention.
Figure 2:
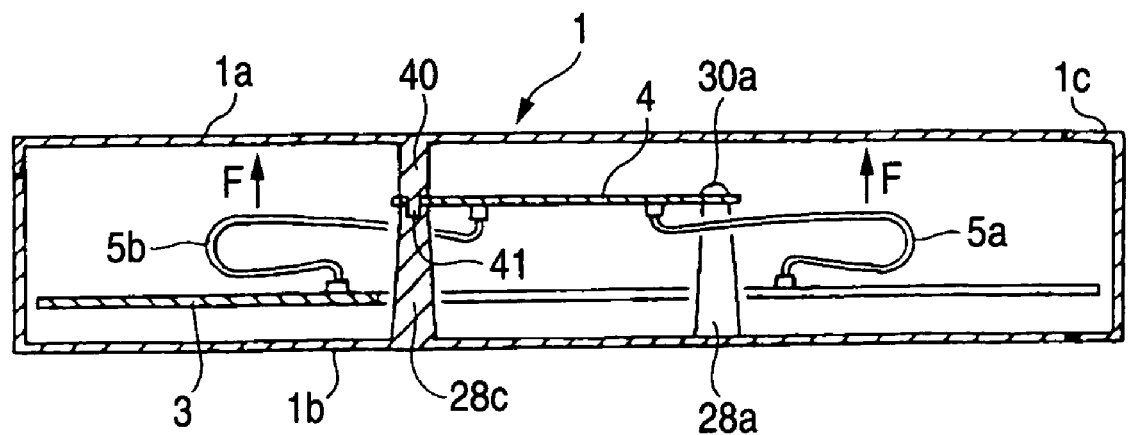
FIG. 2 is a longitudinal sectional view showing the disk device of the first embodiment of the present invention.
Figure 3:
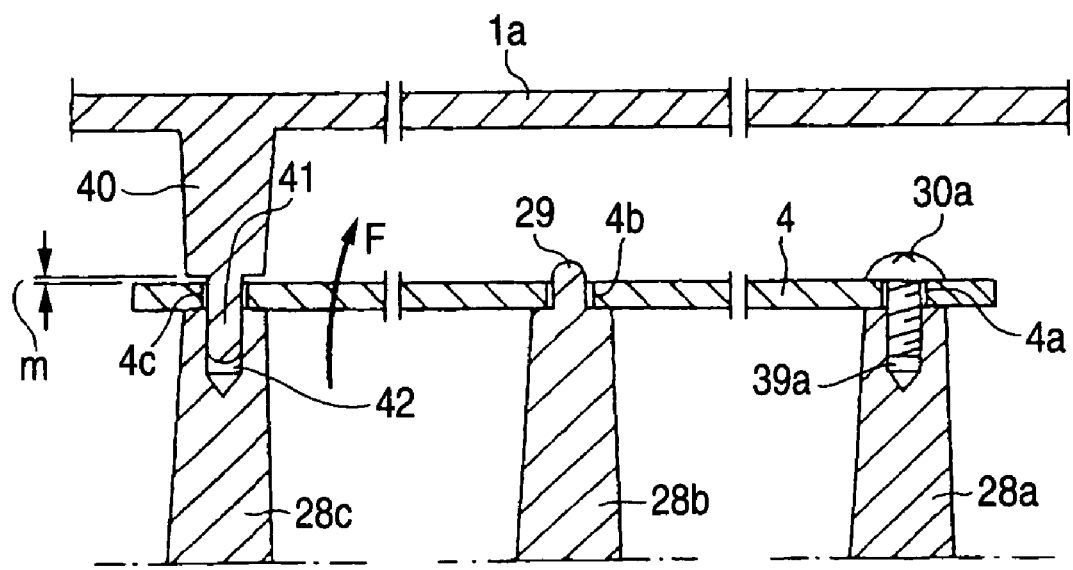
FIG. 3 is an enlarged longitudinal sectional view showing a primary portion of the disk device of the first embodiment of the present invention.

FIGS. 1 to 3 are views showing DVD player (disk device) of the first embodiment of the present invention. The primary printed circuit board 4 is mounted on a plurality of leg rods 28a to 28c integrally protruding from the bottom plate portion 1b. The central insertion hole 4b, which is one of the insertion holes 4a to 4c formed in the three corners of the primary printed circuit board 4, is engaged with the engaging pin 29 integrally protruding from an upper surface of the leg rod 28b. The screw 30a is screwed into the screw hole 39a of the leg rod 28a through insertion hole 4a which is opposed along a diagonal line P. The holding rod 40 is integrally protruded from the roof plate portion 1a being opposed to the insertion hole 4c. The holding pin 41 protruding from a lower surface of the holding rod 40 is engaged into the engaging hole 42 of the leg rod 28c through the insertion hole 4c, so that a small gap m (about 1 mm) can be formed between the lower surface of the holding rod 40 and the primary printed circuit board 4. Except for the above structure, like reference characters are used to indicate like parts in FIGS. 1 to 3 and FIGS. 9 to 14, and the duplicated explanations are omitted here.

According to the above structure, the primary printed circuit board 4 is fixed by one screw 30a and the holding rod 40 having the holding pin 41 which is integrally protruded from the roof-plate portion 1a. Therefore, one screw 30b (shown in FIG. 12A) is omitted as compared with the conventional structure. Due to this omission, the number of parts can be decreased. Therefore, the manufacturing cost can be reduced. Even when an impact force is given to the roof plate portion 1a in the drop test, the impact force is absorbed by the gap m. Therefore, it is possible to prevent the housing 1 from being damaged or broken by the impact force.

The electrostatic prevention plate 36, the width L2 of which is wider than the width L1 of the primary printed circuit board 4, is opposed to the primary printed circuit board 4 and hung from the roof plate portion 1a coming close to the other side wall 31, 32, and a lower end of the electrostatic prevention plate 36 is extended to a portion close to the primary printed circuit board 4.

According to the above structure, a distance on the surface from the gap 34 between the other side wall 31, 32 to the primary printed circuit board 4 through the narrow passage 37, which is formed between the other side wall 31, 32 and electrostatic prevention plate 36, is prolonged. Therefore, even when the electrostatic test is made by an electrostatic tester, the electronic parts A mounted on the primary printed circuit board 4 are not short-circuited by static electricity. Accordingly, there is no possibility that malfunction is caused in the electronic parts A. Further, there is no possibility that the electronic parts A are broken.

Figure 4:
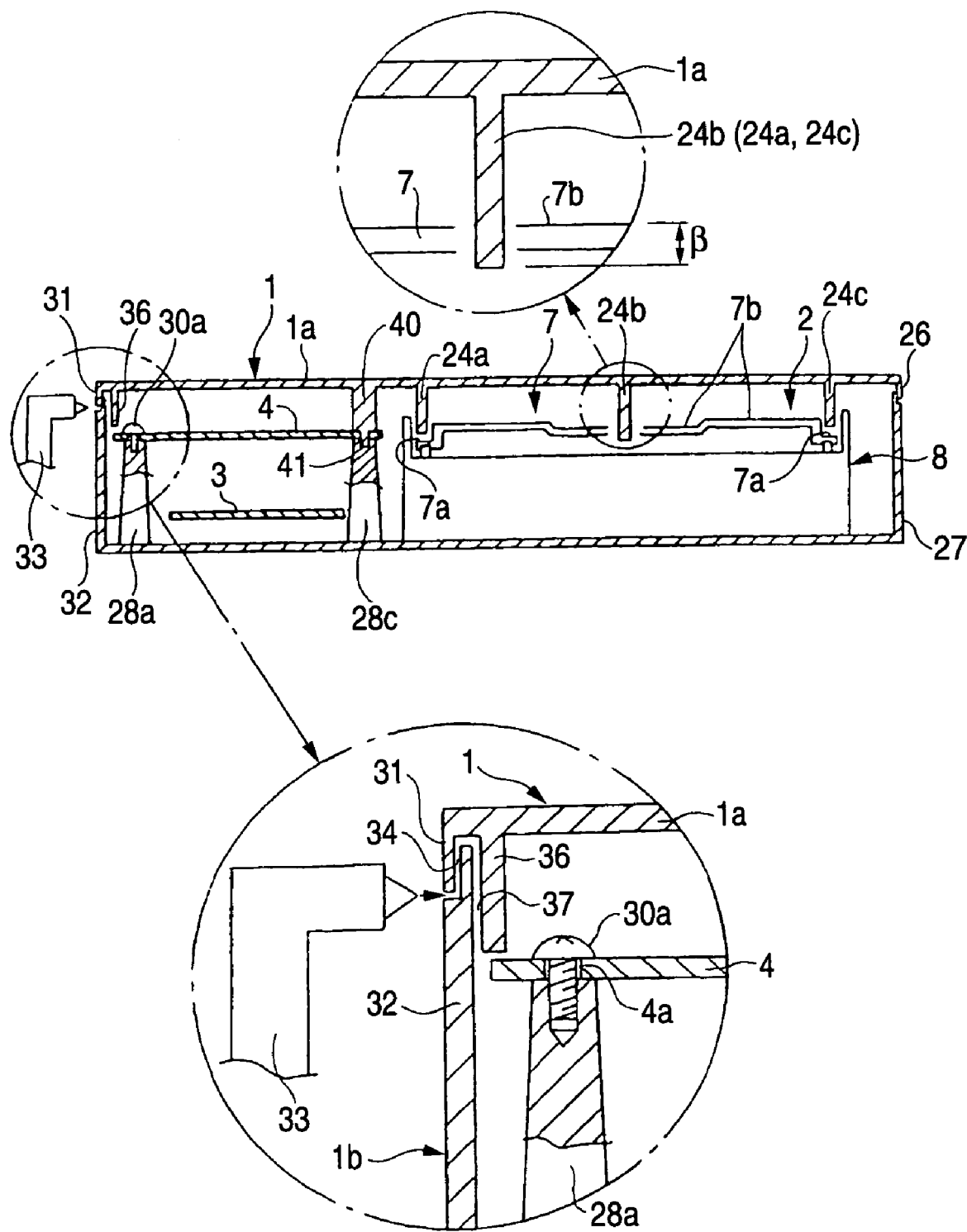
FIG. 4 is a lateral sectional view showing the disk device of the first embodiment of the present invention.
Figure 5:
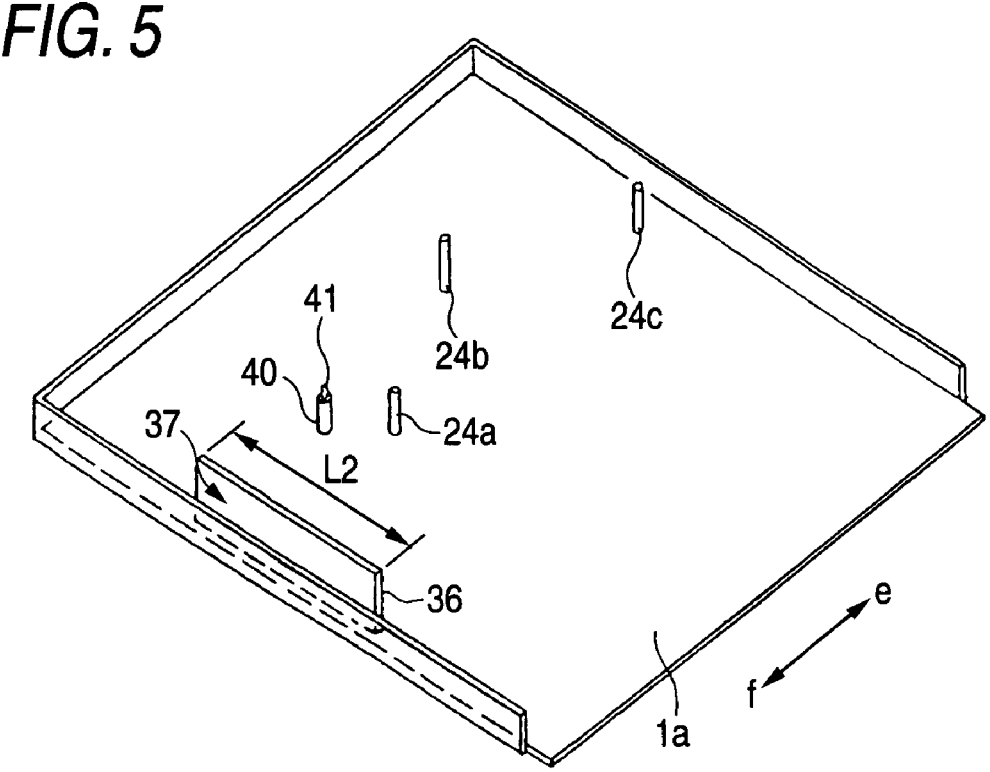
FIG. 5 is a perspective view showing the primary portion of the disk device of the first embodiment of the present invention.

As shown in FIGS. 1, 4 and 5, the protruding portions 24a to 24c are arranged being hung from a lower surface of the roof-plate portion 1a coming close to the rear portion of the tray 7 accommodated in the housing 1. In this embodiment, the three protruding portions 24a to 24c are arranged at predetermined intervals in the lateral direction "e and f" along the outer circumferential edge "B" (shown in FIG. 1) of the disk D which is detached from the disk accommodation recess portion 19 to the rear side "b". The central protrusion 24b is positioned at the rear of the rear end edge central portion of the tray 7 being close to it. The right and the left protruding portion 24a, 24c are positioned above both side edge recess step portions 7a of the tray 7. The lower ends of the protruding portions 24a to 24c are arranged at a predetermined interval β at positions lower than the upper surface 7b of the tray 7.

Figure 6:
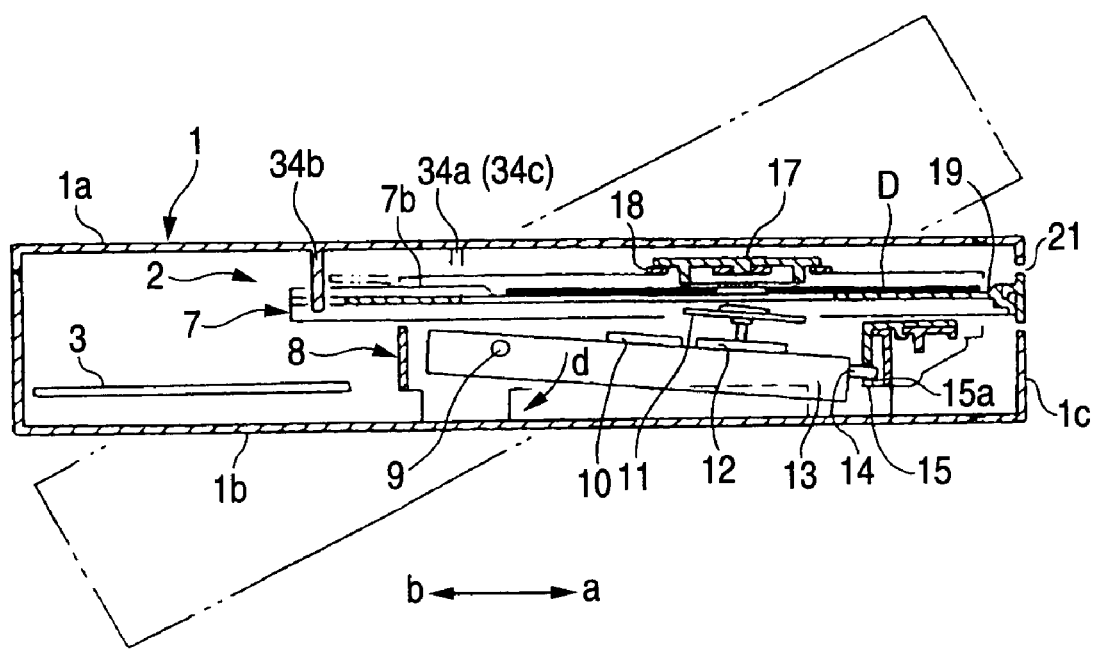
FIG. 6 is a longitudinal sectional view showing a state in which a disk is prevented from being detached from the disk device of the first embodiment of the present invention.
Figure 7A:
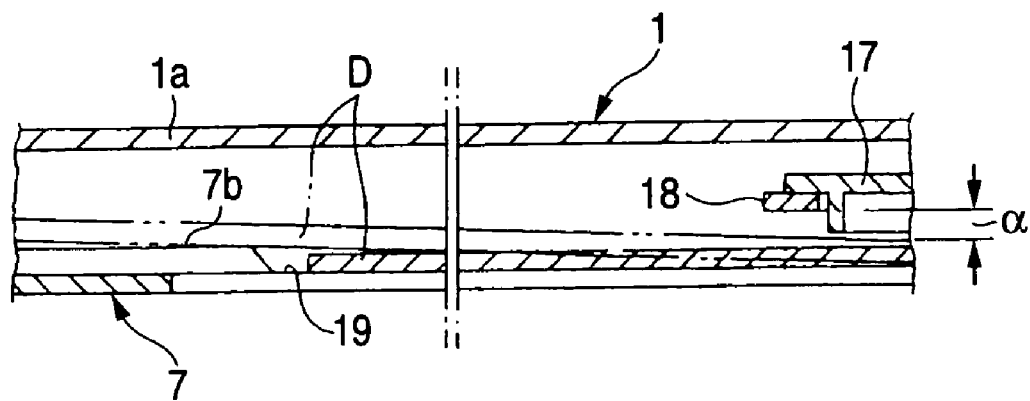
FIG. 7A is an enlarged longitudinal sectional view of the primary portion showing a first half of the action of preventing a disk from being detached from the disk device of the first embodiment of the present invention.
Figure 7B:
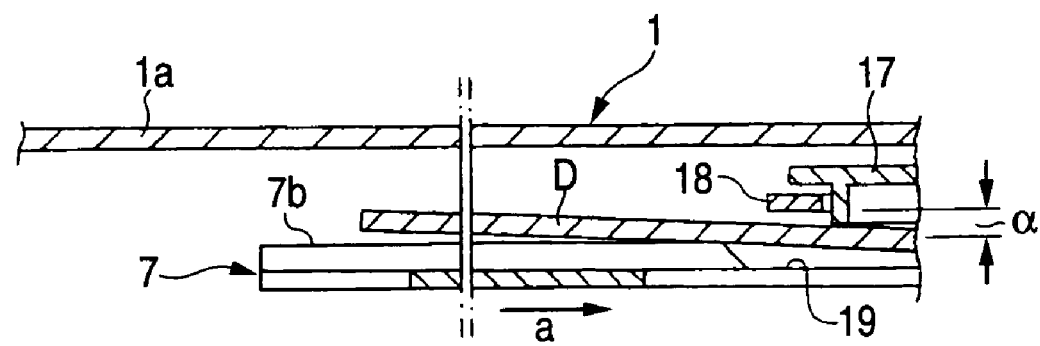
FIG. 7B is an enlarged longitudinal sectional view of the primary portion showing a second half of the action of preventing a disk from being detached from the disk device of the first embodiment of the present invention.

The principle of movement is substantially the same as that of the conventional example shown in FIGS. 9 to 14. Therefore, the explanations are omitted here. As shown in FIG. 6, when the power source is turned off and the drive chassis 13 is stopped in the state "d" in which the drive chassis 13 has been moved downward, the tray 7 is forcibly pushed to the rear side "b" by a finger. When the housing 1 is inclined so that it can be conveyed to another place in the case where the disk D is not held on the tray 7 by the turntable 11 and the disk holder 17, as shown in FIG. 7A, the disk D, which is accommodated in the disk accommodation recess portion 19, is detached to the rear side "b". However, since the protruding portions 24a to 24c are arranged as being hung from the lower surface of the roof plate portion 1a and being close to the rear portion of the tray 7, there is no possibility that the disk D is detached to the rear side "b" getting over the protruding portions 24a to 24c. Since the lower ends of the protruding portions 24a to 24c are positioned at positions lower than the upper surface 7b of the tray 7, there is no possibility that the disk D passes through or under the protruding portions 24a to 24c and is detached to the rear side, that is, the occurrence of a so-called avalanche phenomenon can be positively prevented and the disk D can be kept on the tray 7. When the tray 7 is advanced "a" according to an unloading signal as shown in FIG. 7B, since an interval a between the upper surface 7b of the tray 7 and the cross beam 18 is maintained sufficiently larger than the thickness of the disk D, the disk D can be smoothly taken out from the housing 1 when the tray 7 is advanced "a".

Since the protruding portions 24a to 24c are made of synthetic resin, there is no possibility that the protruding portions 24a to 24c and the electronic parts provided in the unit body 2 are electrically short-circuited to each other.

In the above structure, three protruding portions 24a to 24c are protruded. However, the right and the left protruding portion 24a, 24c may be eliminated and only the central protruding portion 24b may be left.

Figure 8A:
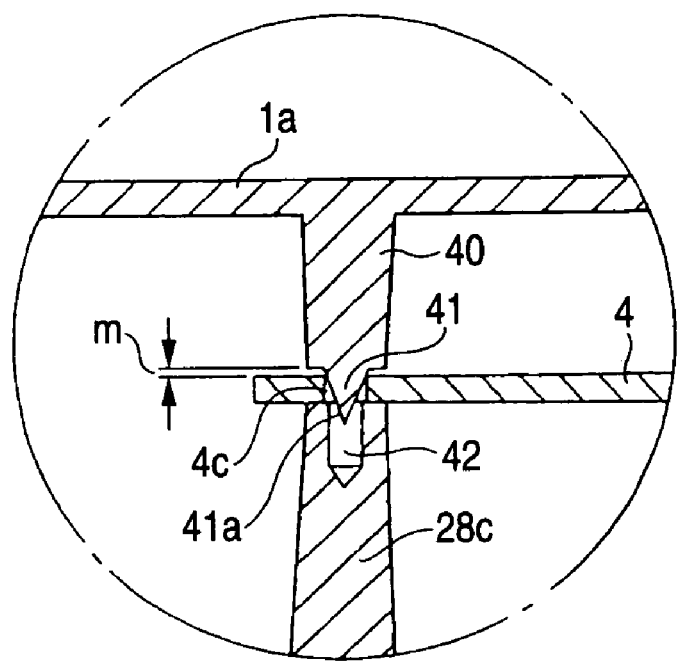
FIG. 8A is an enlarged longitudinal sectional view showing a primary portion of the disk device of the second embodiment of the present invention.

FIG. 8A is a view showing DVD player (disk device) of the second embodiment of the present invention. The outer circumferential surface 41a of the holding pin 41 is formed into a tapered shape being made narrower, and the tapered outer circumferential surface 41a is made to come close to or come into contact with the inner circumferential edge of the insertion hole 4c. Except for the above structure, the second embodiment is substantially the same as the first embodiment shown in FIGS. 1 to 7B. Therefore, like reference characters are used to indicate like parts in the first and the second embodiment and the explanations are omitted here.

According to the above structure, the tapered outer circumferential surface 41a of the holding pin 41 is engaged into the insertion hole 4c as if the holding pin 41 fit into the insertion hole 4c. Therefore, the primary printed circuit board 4 can be more positively fixed.

Figure 8B:
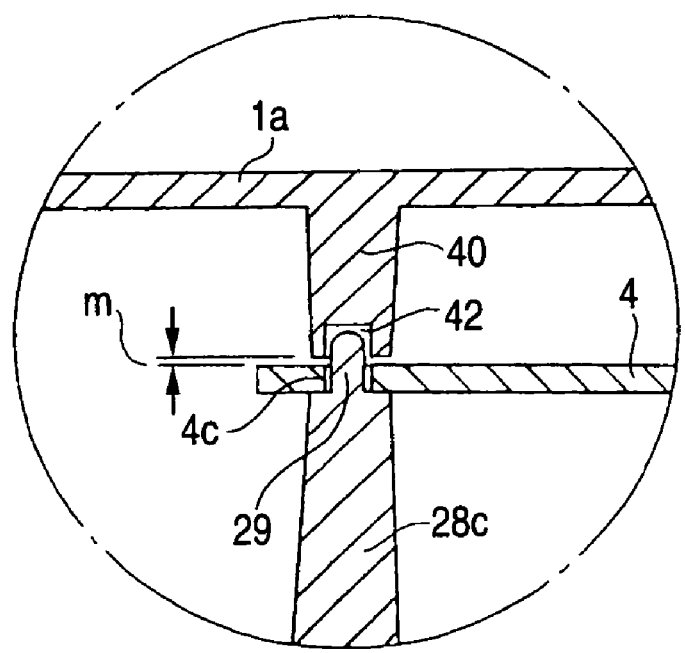
FIG. 8B is an enlarged longitudinal sectional view showing a primary portion of the disk device of the third embodiment of the present invention.
Figure 9:
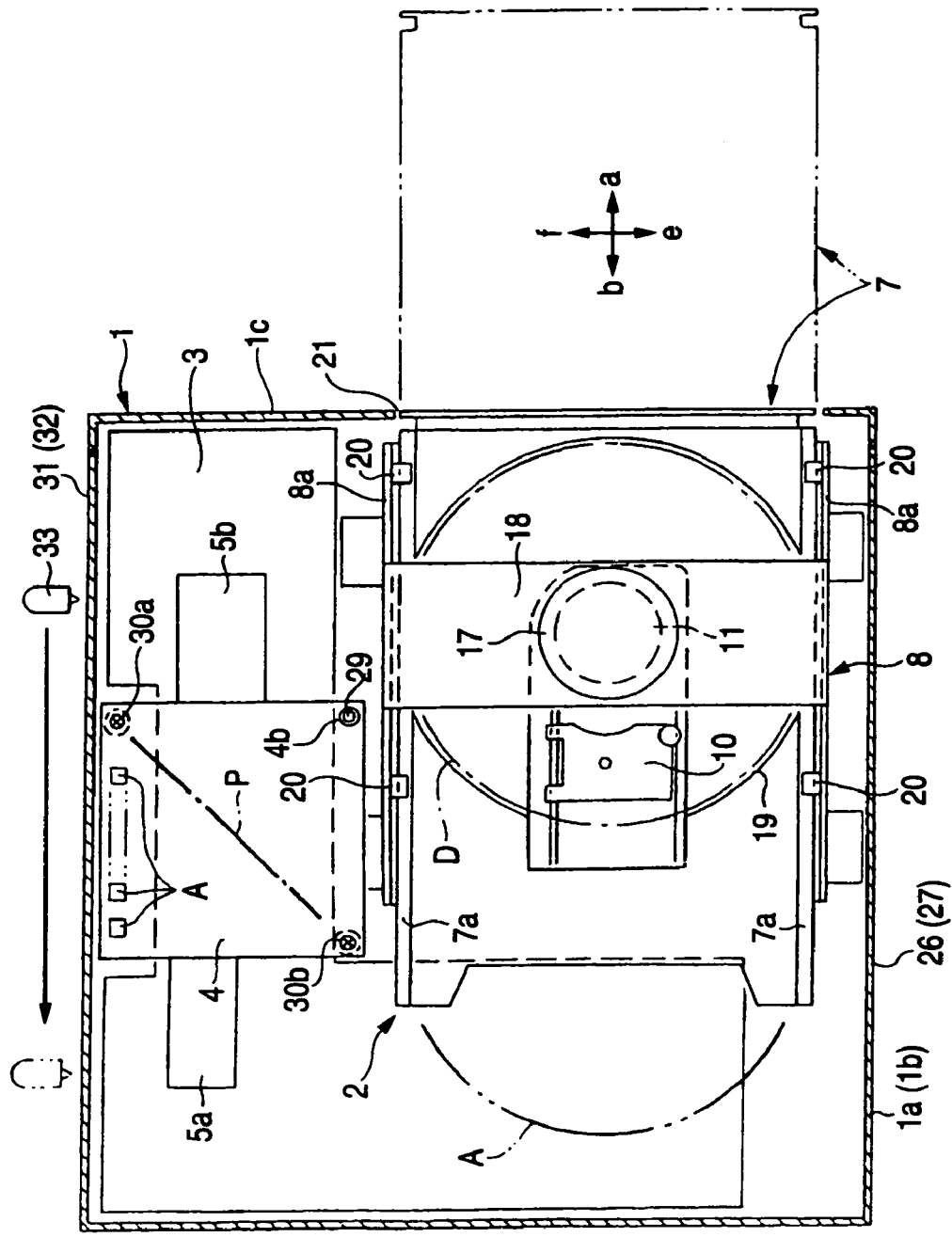
FIG. 9 is a horizontal sectional view showing a conventional example.
Figure 10A:
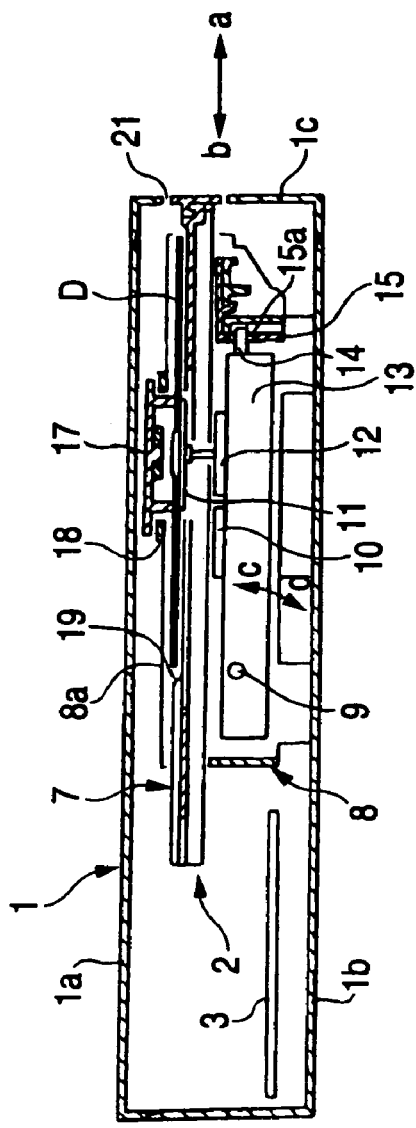
FIG. 10A is a longitudinal sectional view showing a play mode.
Figure 10B:
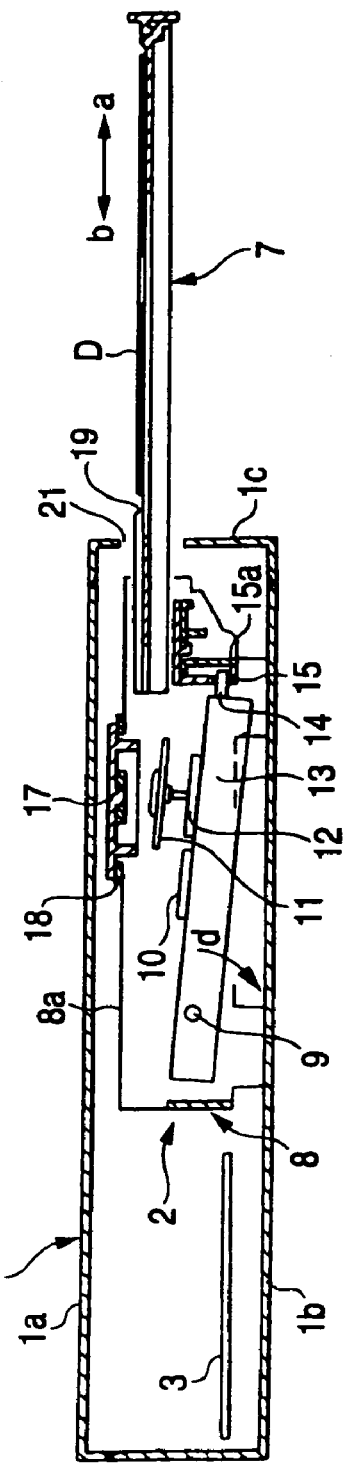
FIG. 10B is a longitudinal sectional view showing an unloading state of the conventional example.
Figure 11:
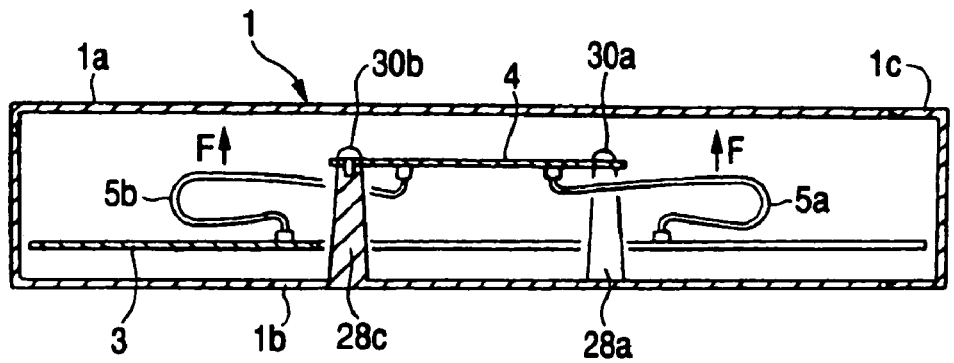
FIG. 11 is a longitudinal sectional view showing the conventional example.
Figure 12A:
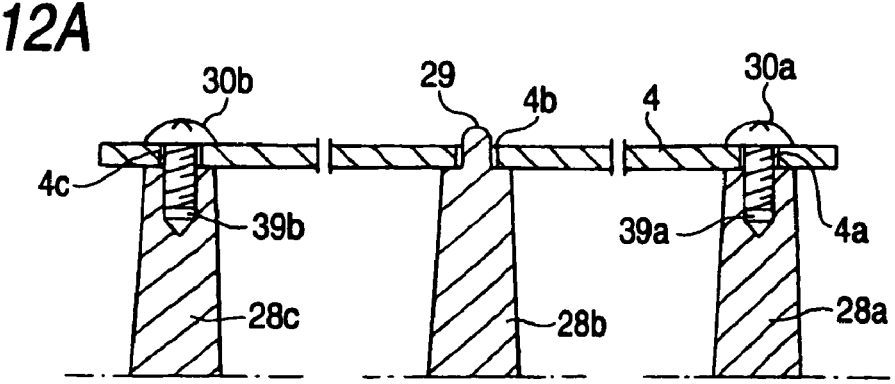
FIG. 12A is an enlarged longitudinal sectional view showing a primary portion of the conventional example.
Figure 12B:
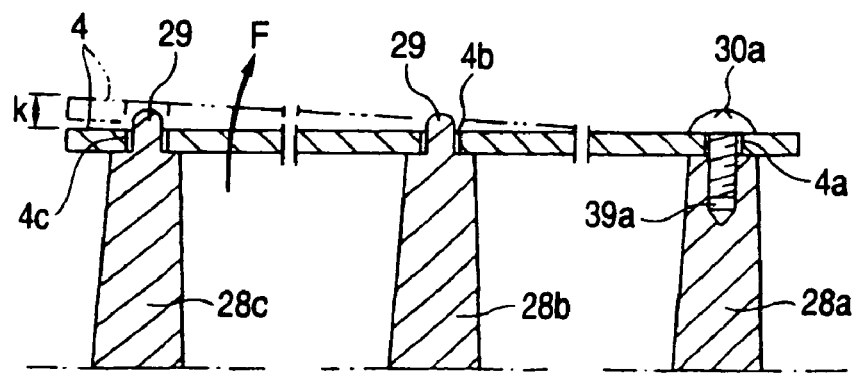
FIG. 12B is an enlarged longitudinal sectional view showing a primary portion of another conventional example.
Figure 13:
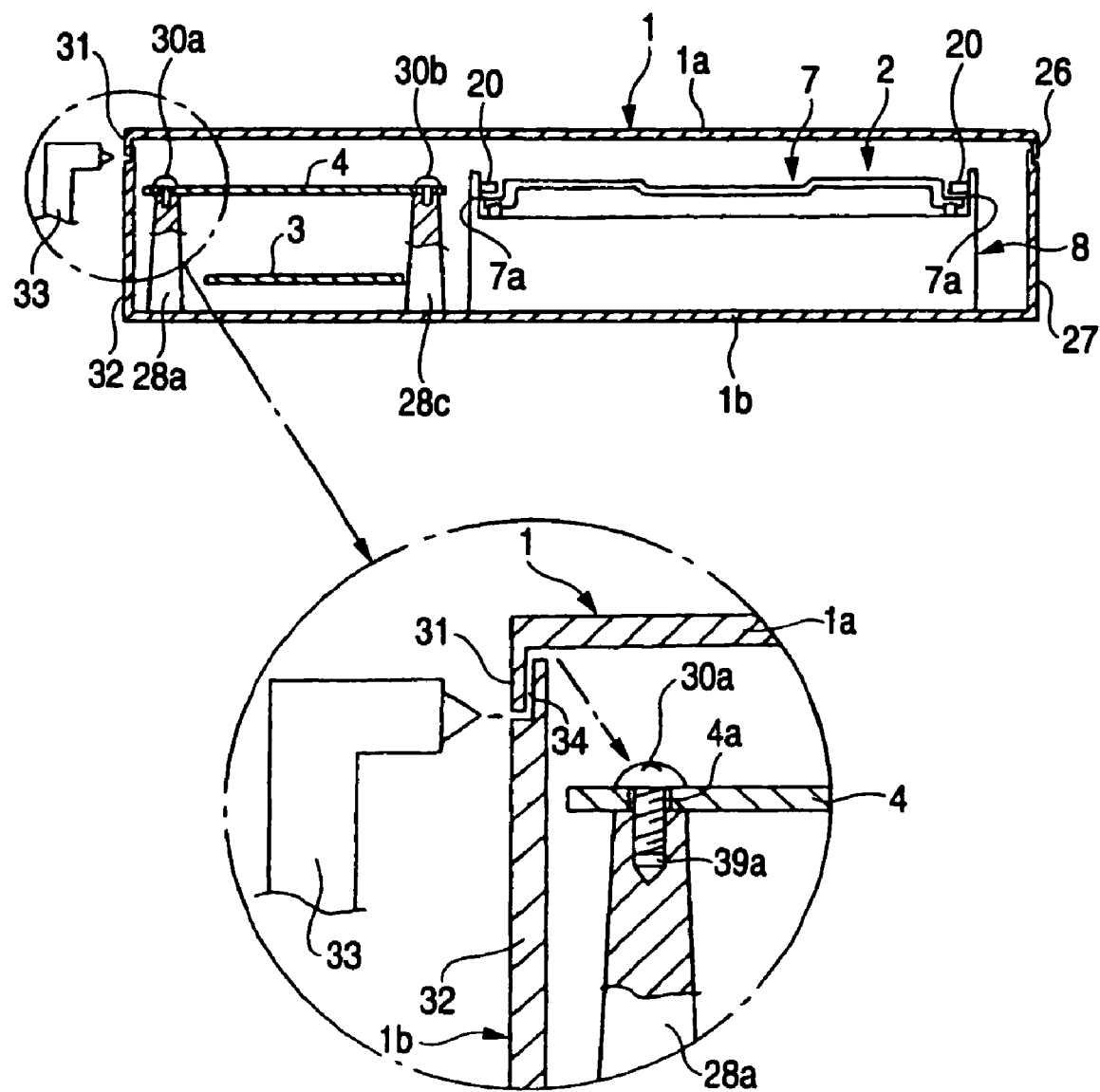
FIG. 13 is a lateral sectional view of the conventional example.
Figure 14:
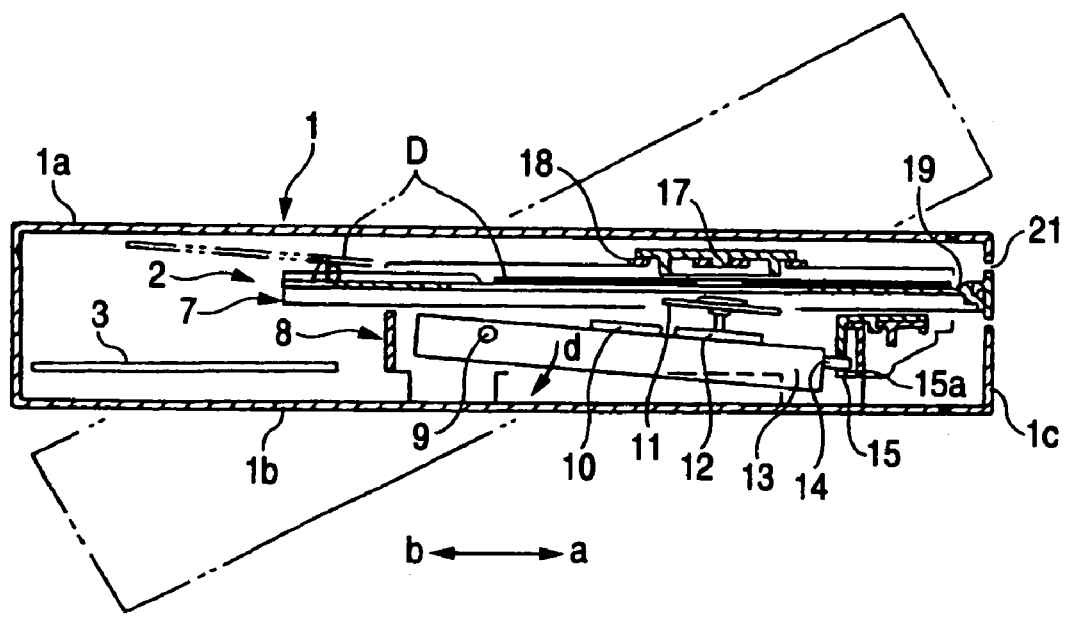
FIG. 14 is a longitudinal sectional view showing a state of preventing a disk from being detached in the conventional example.

FIG. 8B is a view showing DVD player (disk device) of the third embodiment of the present invention. The engaging hole 42 is formed on the lower surface of the holding rod 40, and the engaging pin 29 is integrally protruded from the upper surface of the leg rod 28c being opposed to the engaging hole 42. The engaging pin 29 is engaged in the engaging hole 42 of the holding rod 40 through the insertion hole 4c so as to form a small gap m between the lower surface of the holding rod 40 and the primary printed circuit board 4. Except for the above structure, the second embodiment is substantially the same as the first embodiment shown in FIGS. 1 to 7B. Therefore, like reference characters are used to indicate like parts in the first and the third embodiment and the explanations are omitted here. According to this embodiment, the substantially same effect as that of the first embodiment can be provided.

In the above embodiment, explanations are made into DVD player exclusively used for regeneration. However, it should be noted that the present invention is not limited to the above specific embodiment. For example, the present invention can be applied to various disk devices such as DVD player in which information is regenerated, recorded or deleted.

What is claimed is:

1. A disk device comprising:
   a rectangular box-shaped housing made of synthetic resin that includes a roof plate portion, a bottom plate portion and a front face plate portion;
   a unit body that is arranged in the housing while the unit body is being made to come close to one side wall of the roof plate portion and the bottom plate portion;
   an audio/visual printed circuit board and a rectangular-plate-shaped primary printed circuit board having electronic parts that are arranged upward and downward in a periphery of the unit body in the housing while leaving a predetermined interval between the audio/visual printed circuit board and the primary printed circuit board in the vertical direction, wherein:
   a flexible cable a flexible cable with first and second ends, one end of which is connected to the primary printed circuit board on the upper side, the other end is connected to the audio/visual printed circuit board on the lower side;
   the primary printed circuit board is put on a plurality of leg rods integrally protruding from the bottom plate portion;
   a central insertion hole, which is one of three insertion holes formed in the three corners of the primary printed circuit board, is engaged with an engaging pin integrally protruding from an upper surface of one of the leg rods;
   when a screw is screwed into a screw hole of one of the leg rods through one of two insertion holes opposed to each other along the a diagonal line, the primary printed circuit board is fixed coming close to the other side wall of the roof plate portion and the bottom plate portion;
   the unit body includes a main chassis for supporting a disk tray so that the disk tray can be moved forward and backward and also includes a drive chassis, which is pivotally supported by the main chassis so that the drive chassis can be moved upward and downward, on which an optical pickup and a turntable are mounted, when a drive chassis is moved downward according to an unloading signal in a play mode in which the disk is rotated by the turntable at high speed and information recorded on the disk is read out by the optical pickup, the disk is delivered from the turntable to the tray, after that, the tray is advanced through a disk output port in the front face plate portion, the disk is picked up from the tray and a new disk is put on the tray, when the chassis is stopped in the downward state by turning off the electric power source and the tray is forcibly pushed onto the rear side, the tray is returned into the housing;
   a holding rod is integrally protruded from the roof plate portion being opposed to one of two insertion holes that are opposed to each other along the diagonal line;
   a holding pin protruded from a lower surface of the holding rod is engaged with an engaging hole of one of the leg rods through the other of one of two insertion holes that are opposed to each other along the diagonal line;
   a small gap is formed between a lower surface of the holding rod and the primary printed circuit board;
   an electrostatic prevention plate, the width of which is wider than that of the printed circuit board, is hung from the roof plate portion coming close to the other side wall of the roof plate portion and the bottom plate portion;
   a lower end of the electrostatic prevention plate is extended to a periphery of the primary printed circuit board and comes close to a rear portion of the tray accommodated in the housing;
   a protruding portion is integrally protruded from the roof plate portion; and a lower end of the protruding portion is positioned at a position lower than an upper surface of the tray.

2. A disk device comprising:
   a rectangular box-shaped housing made of synthetic resin that includes a roof plate portion, a bottom plate portion and a front face plate portion;

a unit body that is arranged in the housing while the unit body is being made to come close to one side wall of the roof plate portion and the bottom plate portion;

an audio/visual printed circuit board and a rectangular-plate-shaped primary printed circuit board having electronic parts that are arranged upward and downward in a periphery of the unit body in the housing while leaving a predetermined interval between the audio/visual printed circuit board and the primary printed circuit board in the vertical direction, wherein:

a flexible cable a flexible cable with first and second ends, one end of which is connected to the primary printed circuit board on the upper side, the other end is connected to the audio/visual printed circuit board on the lower side;

the unit body includes a main chassis for supporting a disk tray so that the disk tray can be moved forward and backward and also includes a drive chassis, which is pivotally supported by the main chassis so that the drive chassis can be moved upward and downward, on which an optical pickup and a turntable are mounted, when a drive chassis is moved downward according to an unloading signal in a play mode in which the disk is rotated by the turntable at high speed and information recorded on the disk is read out by the optical pickup, the disk is delivered from the turntable to the tray, after that, the tray is advanced through a disk output port in the front face plate portion, the disk is picked up from the tray and a new disk is put on the tray, when the chassis is stopped in the downward state by turning off the electric power source and the tray is forcibly pushed onto the rear side, the tray is returned into the housing;

the primary printed circuit board is put on a plurality of leg rods integrally protruding from the bottom plate portion;

a central insertion hole formed in one of the three corners of the printed circuit board is engaged with an engaging pin integrally protruding from an upper surface of one of the leg rods;

a screw is screwed into a screw hole of one of the leg rods through one of the insertion holes opposed to each other along a diagonal line;

a holding rod is integrally protruded from the roof plate portion being opposed to one of the insertion holes opposed to each other along the diagonal line; and the holding rod and the leg rod, which is opposed to the holding rod, are engaged with each other through one of the insertion holes.

3. The disk device according to claim 2, wherein:

a holding pin is integrally protruded from a lower surface of the holding rod;

an engaging hole is formed on an upper surface of the leg rod opposing the holding pin; and the holding pin is engaged in an engaging hole of the leg rod through one of the insertion holes so as to form a small gap between the lower surface of the holding rod and the primary printed circuit board.

4. The disk device according to claim 3, wherein:

an outer circumferential surface of the holding pin is formed into a tapered shape being made narrower; and the tapered outer circumferential surface is made to come close to or come into contact with an inner circumferential edge of one of the insertion holes.

5. The disk device according to claim 2, wherein:

an engaging hole is formed on the lower surface of the holding rod;

an engaging pin is integrally protruded from the upper surface of the leg rod being opposed to the engaging hole; and the engaging pin is engaged in the engaging hole of the holding rod through one of the insertion holes so as to form a small gap between the lower surface of the holding rod and the primary printed circuit board.

6. The disk device according to claim 2, wherein:

an electrostatic prevention plate, the width of which is wider than that of the primary printed circuit board, is opposed to the primary printed circuit board and hung from the roof plate portion coming close to the other side walls of the roof plate portion and the bottom plate portion; and a lower end of the electrostatic prevention plate is extended to a portion close to the primary printed circuit board.

7. The disk device according to claim 2, wherein:

a protruding portion is arranged being hung from the roof plate portion coming close to a rear portion of the tray accommodated in the housing; and a lower end of the protruding portion is positioned at a position lower than the upper surface of the tray.

* * * * *